Oct. 31, 1961 C. L. SNYDER 3,007,067

PULSE CODE GENERATOR ASSEMBLY

Filed Sept. 28, 1959

Christopher L. Snyder
INVENTOR

BY Greene, Pineles & Durr
ATTORNEY

United States Patent Office 3,007,067

Patented Oct. 31, 1961

3,007,067

PULSE CODE GENERATOR ASSEMBLY

Christopher L. Snyder, Plainfield, N.J., assignor to Steatite Research Corporation, Keasbey, N.J., a corporation of Delaware Filed Sept. 28, 1959, Ser. No. 842,659

2 Claims. (Cl. 310—111)

This invention relates to a pulse code generator assembly of the type which comprises magnetic code generator disks which are rotatably mounted to brush or sweep across the face of a pick-up device and thereby generate, by means of changing flux, a predetermined pulse pattern. Such devices are used in telemetering devices, for example.

Among the objects of the invention is to provide a device of the type described which due to its structure is more easily and economically manufactured.

The objects of the invention are attained by making the device in two or more parts. The first part comprising the patterned surface of the disk which must be accurately formed is made of a magnetically soft, ferromagnetic material such as soft iron. Such magnetically soft ferromagnetic materials are easily and accurately shaped and molded. The second part is made of a magnetically hard ferromagnetic material, i.e., a material suitable for the manufacture of permanent magnetic material such as barium ferrites, alnico and cunife alloys, etc. Such permanent magnet materials are difficult to mold to intricate and accurate shapes. The two parts are united in any suitable way by cements, glazes, adhesives, or by mechanical means such as rivets, bolts, clamps, etc. The two parts are eventually united to a third part, the shaft for rotating the device. The parts may be fixed to the shaft by cement, adhesives or by keying means, etc.

The technical advantage of making the disk in two parts according to the present invention lies in this, that it is much easier to precisely form the face of the disk from magnetically soft iron, the hard ferromagnetic portion of the invention on the other hand may be molded in its flat shape and if necessary ground to fit the contacting flat face of the iron portion. The permanent magnetism of the hard ferromagnetic portion induces the desired magnetic effect in the soft iron portion.

Further objects and advantages will become apparent as the description proceeds.

Figure 1:
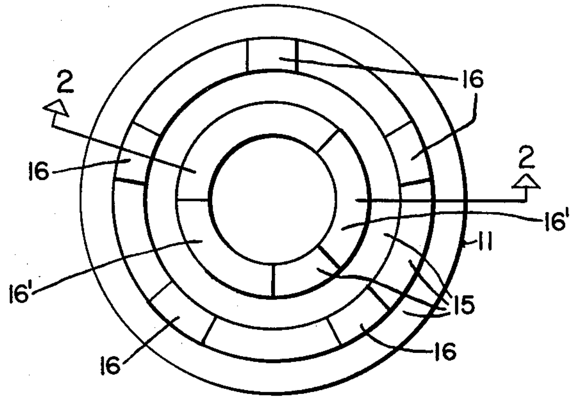
FIG. 1 is a top plan of the device of the invention.
Figure 2:
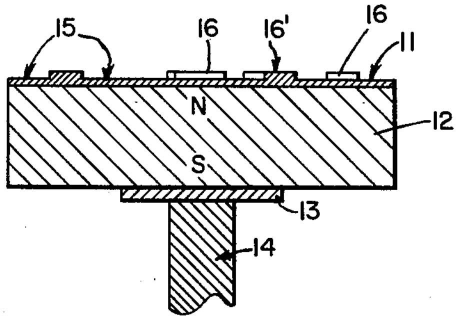
FIG. 2 is a side cross sectional view taken on line 2—2 of FIG. 1.

The top surface of the plate 11 shown in FIG. 1 comprises a plurality of concentric circular ring sections 15, alternate ones of which contain a plurality of flat or raised segments 16 and 16'. As the device is rotated by means of shaft 14, the raised portions 16 sweep past at least one pick-up device (not shown) which is positioned close to the circular sections 15 containing said raised portions 16. The changing flux at the space between disk 11 and pick-up device due to changes in the air gap generate the pulses in the pick-up device. Similarly raised portions 16' sweep past at least one pick-up device positioned adjacent the path of their circular section 15. More or fewer projections 16 and 16' may be provided and also more paths which include similar projections may be applied. The structure of the face of the disk 11 itself is not new and is not a part of the invention except that in so far as it is necessary or desirable to make intricately patterned surfaces, such surfaces can be made with greater perfection in accordance with the present invention. The member 11 is made of magnetically soft iron formed by stamping, coining, etching, etc.

The portion 12 is made from hard ferromagnetic ceramics or alloys. Such hard ferromagnetic materials are difficult to form with detailed projections thereon but may be readily formed to the disk shape of the member 12. For example, all of such hard ferromagnetic materials may be formed to the shape of member 12 by compressing the powdered ceramic or alloy material and then sintering the pressed body. During sintering a certain amount of contraction may occur but the shape of the flat disk 12 is not materially altered. The part 12 is magnetized to provide it with permanent magnet properties after sintering.

The composite disk 11—12 may be attached to the shaft 14 in any known way. In the device shown the shaft 14 is provided with an enlarged head 13 to present an enlarged surface for cementing to the disk 12. The head 13 is cemented to disk 12 by means of an epoxy cement, for example.

The features and principles underlying the invention described above in connection with specific exemplifications will suggest to those skilled in the art many other modifications thereof. It is accordingly desired that the appended claims shall not be limited to any specific feature or details thereof.

I claim:

1. In a pulse generating device of the rotating-disk ferromagnetic type adapted to generate pulses on rotation due to a changing in air gap between relatively high and low patterned surface portions of the disk and pick-up means positioned adjacent the surface of said disk, the improvement comprising a composite rotatable disk formed of two disk-shaped parts, a first of said disk-shaped parts being formed of magnetically soft iron, said first disk shaped part containing high and low patterned portions on the outer surface thereof and comprising a flat, inner surface, said second disk-shaped part comprising one flat surface united to the flat surface of the first disk shaped part, said first disk-shaped part being formed of a magnetically soft ferromagnetic iron, said second disk shaped part being formed of a magnetically hard ferromagnetic material and being magnetized.

2. The device as claimed in claim 1 comprising a shaft means extending axially from that surface of the second disk-shaped part which is opposite to the surface united to the first disk-shaped part.

References Cited in the file of this patent

UNITED STATES PATENTS 2,900,612 Tripp ---------------- Aug. 18, 1959